(12) United States Patent
Fitzpatrick et al.

(10) Patent No.: US 10,532,685 B2
(45) Date of Patent: Jan. 14, 2020

(54) VEHICLE WITH RECONFIGURABLE SEAT AND FOOT REST

(71) Applicant: Faurecia Interior Systems, Inc., Auburn Hills, MI (US)

(72) Inventors: Robert Fitzpatrick, Holland, MI (US); Markus Uhlig, Stuttgart (DE); Desmond O'Regan, Bad Homburg (DE); Matthew Benson, Holland, MI (US); Fabrice Aycoberry, St. Germain en Laye (FR)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/852,760

(22) Filed: Dec. 22, 2017

(65) Prior Publication Data

US 2018/0186266 A1     Jul. 5, 2018

Related U.S. Application Data

(60) Provisional application No. 62/440,662, filed on Dec. 30, 2016.

(51) Int. Cl.
*B60N 3/06* (2006.01)
*B60N 2/14* (2006.01)

(52) U.S. Cl.
CPC ............. *B60N 3/063* (2013.01); *B60N 2/14* (2013.01)

(58) Field of Classification Search
CPC ............. B60N 2/14; B60N 3/06; B60N 3/063
USPC .................................... 296/65.06, 65.07, 75
See application file for complete search history.

(56) References Cited

U.S. PATENT DOCUMENTS

| | | | |
|---|---|---|---|
| 6,241,301 B1 | 6/2001 | Speth et al. | |
| 6,572,172 B1* | 6/2003 | Ninomiya | B60N 2/0232 296/65.07 |
| 8,807,623 B2 | 8/2014 | Bohmer et al. | |
| 9,066,596 B2* | 6/2015 | Clark | B63B 29/04 |
| 2011/0168077 A1* | 7/2011 | Bostrom | A47C 9/022 114/363 |
| 2017/0050539 A1* | 2/2017 | Akimoto | B60N 2/0232 |

FOREIGN PATENT DOCUMENTS

| | | |
|---|---|---|
| CA | 2791131 A1 | 3/2014 |
| CN | 203557981 U | 4/2014 |
| DE | 10216126 A1 | 11/2003 |
| DE | 102013215314 A1 | 2/2014 |
| DE | 102014205211 A1 | 9/2015 |
| FR | 2880597 A1 | 7/2006 |
| JP | 2006-219070 * | 8/2006 |
| WO | WO2011151566 A1 | 12/2011 |

* cited by examiner

*Primary Examiner* — Dennis H Pedder
(74) *Attorney, Agent, or Firm* — Reising Ethington P.C.

(57) ABSTRACT

A foot rest for use in a reconfigurable passenger cabin of a personal automotive vehicle is moveable between a first position and a second position. In the second position, a resting surface of the foot rest is inclined to face toward a seat when the seat is moved away from a forward-facing position to a rotated position. In the first position, the resting surface can be level with a floor of the passer cabin, facing toward a different seat, or facing toward the same seat as in the second position. The foot rest provides stability to a seat occupant when the seat is moved into unconventional positions, such as rotated or extreme rearward positions.

14 Claims, 3 Drawing Sheets

VEHICLE WITH RECONFIGURABLE SEAT AND FOOT REST

TECHNICAL FIELD

The present disclosure relates generally to personal automotive vehicles with reconfigurable passenger cabins and is particularly pertinent to autonomous vehicles.

BACKGROUND

Personal automotive vehicles have evolved over several decades to require less attention from a human driver during vehicle operation. For instance, modern automobiles may be equipped with headlights that self-illuminate in low lighting conditions, windshield wipers that self-activate during rainy weather, or climate-control systems that automatically regulate the temperature of the passenger cabin, to name a few examples. Emerging technologies now enable automobiles to continuously monitor surrounding road and traffic conditions, have real-time knowledge regarding the global position of the vehicle, and to control vehicle acceleration, braking, and navigation based on this information. The trend is toward fully autonomous vehicles, in which little to no attention to vehicle operation is required from vehicle occupants once a destination for the vehicle is determined. In such vehicles, vehicle occupants are free to turn their attention to matters other than driving, such as work-related tasks, entertainment, or relaxation.

During the transition from traditional driver-operated vehicles to fully autonomous vehicles, reconfigurable passenger cabins may be employed to accommodate both a driver mode and an autonomous mode. With driver attention to vehicle operation not required in the autonomous mode, the driver may wish to assume a different or more comfortable seating position than the one required during traditional vehicle operation, in which driver feet must be near the accelerator and brake pedal and driver arms must be able to reach and turn the steering wheel, operate turn signals, etc. Indeed, in traditional driver-operated vehicles, there is very little room available for occupants to assume different seating positions. This is particularly true in the front row of seats where the driver and/or passenger is closely surrounded by a center console, instrument panel(s), arm rests, and steering wheel. It may thus become desirable to increase the amount of free space surrounding the vehicle occupants in the autonomous vehicle mode to allow more freedom of movement. This comes with a whole new set of problems not before encountered in a vehicle passenger cabin. For instance, during an autonomous mode, passengers may wish to fully extend their legs by repositioning the seat toward the rear of the vehicle, only to find the expected increase in comfort absent due to a loss of limb support that was present in the driver mode.

U.S. Pat. No. 6,241,301 to Speth et al. discloses a foot rest for use in a motor vehicle. The foot rest is interconnected with a floor of the passenger cabin for movement between a first flush position and a second inclined position relative to the floor, and can be incrementally positioned at various levels of incline between the first and second position. The foot rest is specifically intended for use with passenger seating areas rather than a driver seating area and is located in a fixed position along the cabin floor.

SUMMARY

In accordance with an embodiment, a personal automotive vehicle having a reconfigurable passenger cabin includes a vehicle body, a seat, and a foot rest. The vehicle body includes a floor that partly defines an interior of the passenger cabin. The seat is in the interior and over the floor of the passenger cabin and is coupled with the vehicle body for rotational movement about a vertical axis between a forward-facing position and a rotated position. The foot rest is mounted in the interior of the passenger cabin for movement between a first position and a second position and includes a resting surface spaced from and inclined to face toward a front side of the seat when in the second position with the seat in the rotated position.

In some embodiments, the rotated position of the seat is an inwardly-rotated position.

In some embodiments, the foot rest is mounted along the floor of the vehicle body such that the resting surface is declined to match the surface of the surrounding floor when in the first position.

In some embodiments, the foot rest is mounted along the floor at a fixed position corresponding to a pre-determined inwardly-rotated position of the seat.

In some embodiments, the seat is included in a front row of one or more seats.

In some embodiments, the seat is a first seat of a row of seats that includes a second seat, and the resting surface is inclined to face toward a front side of the second seat when the foot rest is in the first position.

In some embodiments, the seat is configured for rotational movement about the vertical axis between the forward-facing position and a plurality of rotated positions, and the foot rest is configured for movement between the first position and a plurality of different positions corresponding to the plurality of rotated positions of the seat. The resting surface of the foot rest is inclined to face toward the front side of the seat at the same orientation with respect to a longitudinal axis of the seat in each one of the plurality of different positions.

In some embodiments, the foot rest is coupled with the seat for continuous coordinated movement with the seat during rotation of the seat about the vertical axis.

In some embodiments, the foot rest is coupled with the seat for movement between the first and second positions, the first position being a stowed position and the second position being an extended position.

In some embodiments, the foot rest is coupled with the floor.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a moveable foot rest for use in a reconfigurable passenger cabin of a personal automotive vehicle. The foot rest may assume various positions to provide occupants of one or more seats in the passenger cabin with support for their lower limbs when the seat is moved into unconventional positions, such as rotated and/or extreme rearward positions. While presented in the context of a front row of seats in the passenger cabin of an autonomous vehicle, the teachings presented herein are applicable to non-autonomous vehicles as well. For example, the unconventional passenger cabin configurations presented here may be employed while a vehicle is parked and/or used with second or third row seating.

Figure 1:
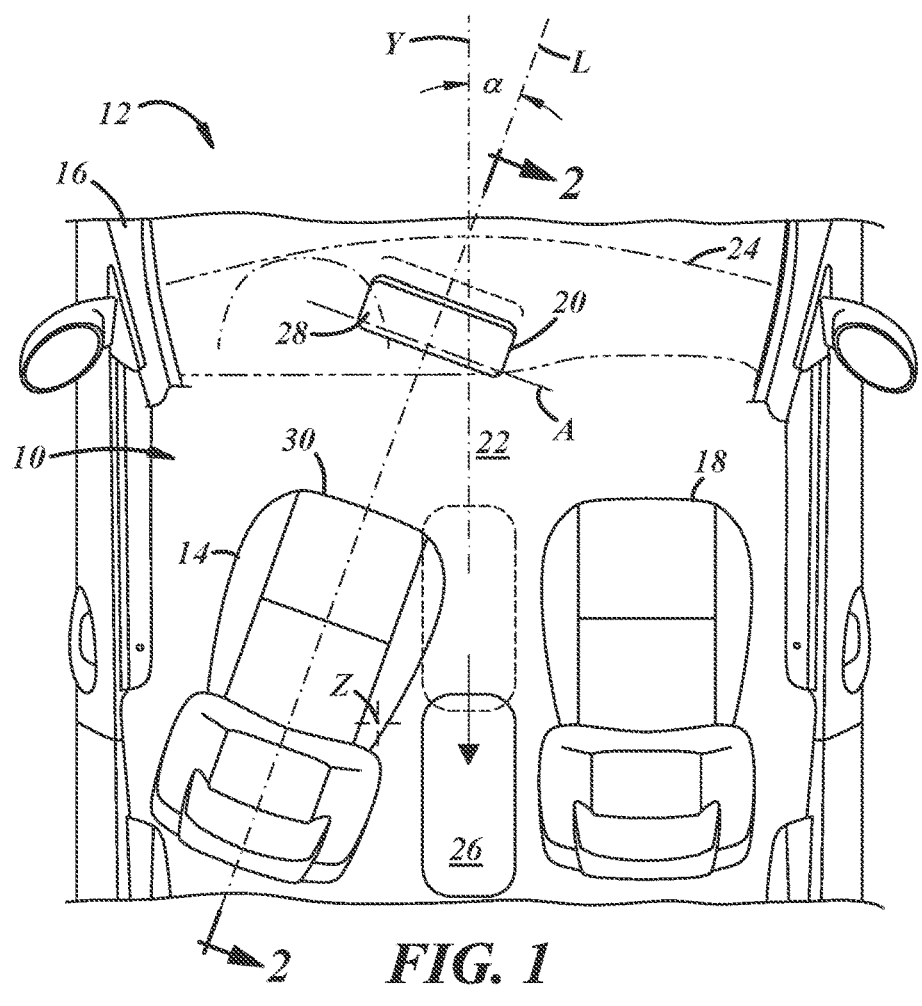
FIG. 1 is a top view of an interior of a reconfigurable passenger cabin of a personal automotive vehicle, illustrating a first seat in an inwardly-rotated position and a foot rest.

Referring to FIG. 1, there is shown a top view of the interior of a passenger cabin 10 of a personal automotive vehicle 12. As used herein, the term "personal automotive vehicle" is intended to include those types of vehicles intended primarily for personal use that usually have one to three rows of seats and are generally sized to fit in home garages and standard-size parking spaces. Examples include passenger cars, coupes, sedans, SUVs, cross-over vehicles, and light-duty pick-up trucks. The illustrated passenger cabin 10 is reconfigurable between a driving configuration and an autonomous configuration. FIG. 1 shows the passenger cabin 10 configured in one example of an autonomous configuration in which a seat 14 is rotated away from a forward-facing position.

The illustrated vehicle 12 includes a vehicle body 16, a first seat 14 on a driver side of the vehicle, a second seat 18 on a passenger side of the vehicle, and a foot rest 20 mounted in the interior of the passenger cabin 10. The vehicle body 16 is structural in nature and includes a floor 22 that partly defines the interior of the passenger cabin 10. Each seat 14, 18 is located over the floor 22 in the interior of the passenger cabin 10 and may be coupled with the vehicle body 16 for rotational movement about a vertical axis Z between a forward-facing position and a rotated position. In the example of FIG. 1, the second seat 18 is in the forward-facing position, and the first seat 14 is rotated away from its forward-facing position to a rotated-position. An angle of rotation α about the vertical axis Z is formed between the forward-facing and rotated positions and is also defined between a longitudinal axis L of the seat 14 and a longitudinal axis Y of the vehicle 12.

In this example, the first seat 14 is shown in an inwardly-rotated position with the seat rotated about the vertical axis Z such that the angle α is about 15-25 degrees from the forward-facing position. Here, "inwardly" means the front of the seat 14 is facing in a direction that intersects the central longitudinal axis Y of the vehicle 12. There may be a particular pre-determined value for the angle α that is one of several inwardly-rotated positions and at which the seat 14 is configured to lock in place such that angular movement is prevented. Both seats 14, 18 are also illustrated in respective rearward positions, farther away from the front of the vehicle 12 than when in the driving configuration of the cabin 10 and respective forward positions of the seats. Each seat 14, 18 is coupled with the vehicle body such that the vertical axis of rotation Z moves with the forward and rearward movement of the seat.

Figure 3:
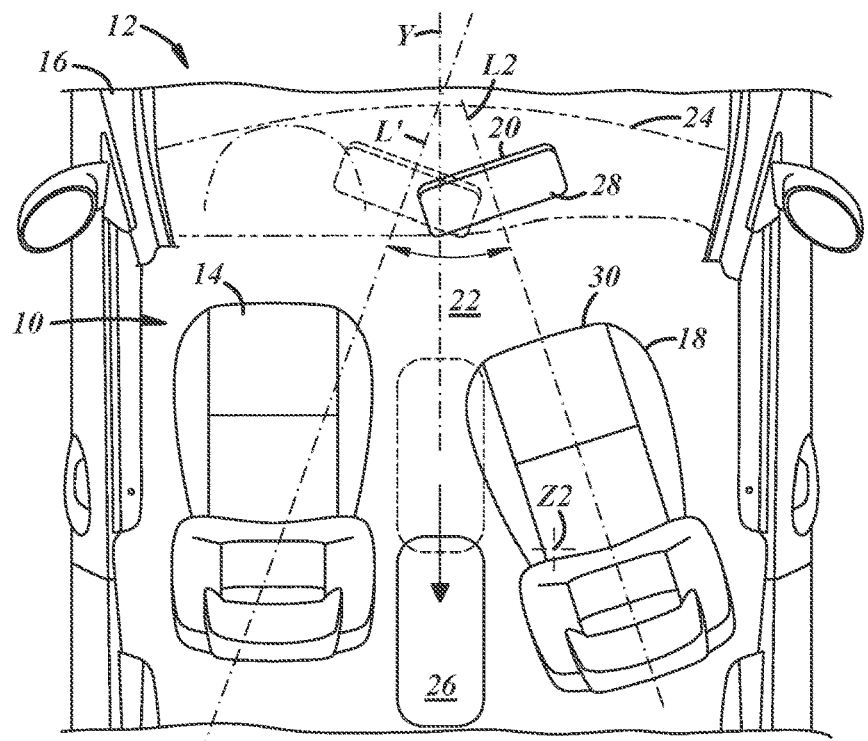
FIG. 3 is the top view of the interior of the reconfigurable passenger cabin of FIG. 1, illustrating a second seat in an inwardly-rotated position with the foot rest facing the second seat.
Figure 4:
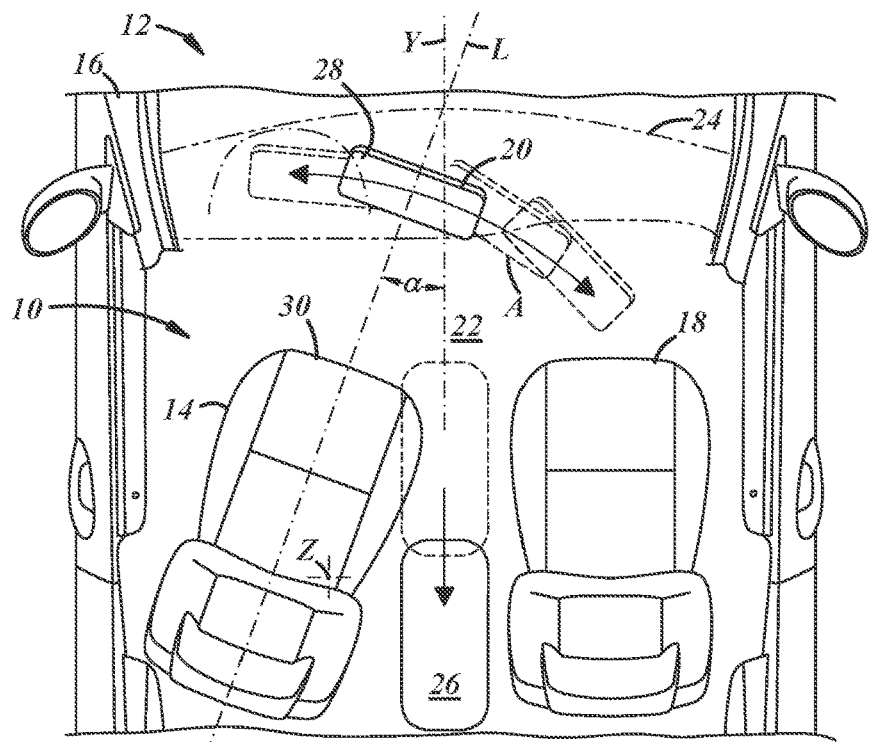
FIG. 4 is the top view of the interior of the reconfigurable passenger cabin of FIGS. 1 and 3, illustrating the foot rest in a plurality of different positions that correspond to rotation of the first seat.

Other characteristics of the autonomous configuration may include a steering wheel (not shown in FIG. 1) in a retracted position, farther toward the front of the vehicle 12 and closer to an instrument panel 24 than when in the driving configuration, and a center console 26 in a stowed position, farther rearward and/or lower than when in the driving configuration. The instrument panel 24 transversely spans the front of the passenger cabin 10, is spaced above the floor 22 of the vehicle body 16, and is shown in phantom in FIG. 1 and in subsequent top views of the passenger cabin (FIGS. 3 and 4).

Figure 2:
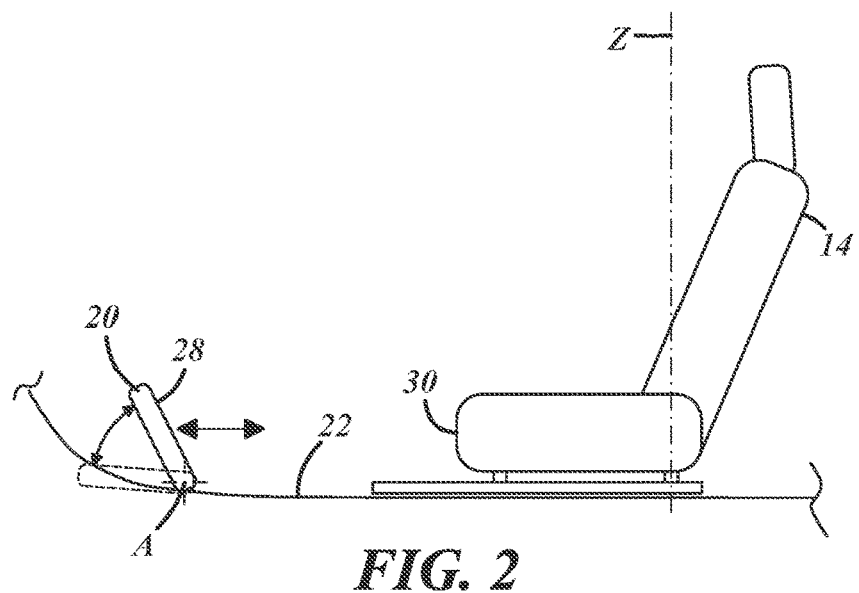
FIG. 2 is schematic cross-sectional view of the inwardly-rotated seat and foot rest of FIG. 1.

The foot rest 20 includes a resting surface 28 and is configured for movement between a first position and a second position. FIGS. 1 and 2 illustrate the foot rest 20 in one example of the second position with the first position shown in broken lines. The resting surface 28 is sized and shaped to accommodate the feet of an occupant of the seat 14. While shown as a flat surface here, the resting surface 28 may be contoured and/or include recessed or protruding features. When in the second position, the resting surface 28 is spaced from and inclined to face toward a front side 30 of the seat with the seat in the rotated position. The foot rest 20 thus lies along the longitudinal axis L of the seat 14 when the foot rest is in the second position and at least when the seat 14 is in the rotated position.

In the example of FIGS. 1 and 2, the foot rest 20 is coupled with the floor 22 of the vehicle body 16, and the movement of the resting surface 28 between the first and second positions is rotational movement about a pivot axis A. The pivot axis A is generally horizontal and perpendicular to the longitudinal axis L of the seat 14 when the seat is in the rotated position as shown. In the illustrated first position, the foot rest 20 and the resting surface 28 are declined toward the floor 22 to a generally horizontal orientation. In this example, the foot rest 20 is constrained such that the pivot axis A is at a fixed angle (i.e., 90°−α) with respect to the longitudinal axis Y of the vehicle, where α is defined at a pre-determined inwardly-rotated position of the seat 14. In one embodiment, the location and orientation of the pivot axis A is fixed with respect to the vehicle body 16. In other embodiments, the foot rest 20 includes or is coupled with the vehicle body 16 via an adjustment mechanism that allows movement of the resting surface 28 toward and away from the seat 14, as shown in FIG. 2. Such an adjustment mechanism may include, for example, a pin-and-slot coupling between a foot rest mounting bracket and the floor 22, or a scissor mechanism configured to move the resting surface 28 away from a foot rest body, to name a few examples that are not illustrated in detail here.

The rotational movement of the resting surface 28 of the foot rest 20 about the pivot axis A may be provided by known mechanisms that include an actuator such as a motor, solenoid, or fluid-powered cylinder. Manual movement is of course also possible. Movement actuation may be initiated by user input received by a user input device (e.g., a switch or touch interface), or it may be initiated as part of an automated reconfiguration of the passenger cabin between the driving and autonomous configurations. For example, in the driving configuration, the first seat 14 may be in its longitudinally forward position and its forward-facing position with the foot rest 20 in its first position with the resting surface 28 lying generally along the floor 22 of the vehicle. When the vehicle changes to the autonomous mode, the first seat 14 may translate to its rearward position and rotate to the pre-determined inwardly-rotated position, and the foot rest 20 may rotate to its inclined second position. These movements may be coordinated, overlapping in time or occurring simultaneously, or they may happen sequentially. Once the seat 14 is in the rotated position and the foot rest 20 is in the second position, further adjustments of the foot rest 20 and/or seat 14 may be made by the seat occupant, such as adjustments of the angle of inclination of the resting surface 28 or distance of the resting surface from the front 30 of the seat.

In one embodiment, the foot rest 20 is mounted along the floor 22 of the vehicle body 16 such that the resting surface 28 is declined to match the surface of the surrounding floor when in the first position. In another embodiment, the first position and the second position of the foot rest 20 are the same as each other such that the foot rest 20 is always ready to accommodate the feet of the seat occupant when the seat 14 is in the rotated position—i.e., the foot rest 20 remains in the second, inclined position even when the seat 14 is in its forward-facing position.

Providing a foot rest 20 as described herein with the resting surface at an obtuse angle relative to the longitudinal axis of the vehicle 12 helps to solve at least one new problem not encountered in conventional vehicles. For example, it has now been found that, when a vehicle is constructed with a seat configured for rotation about a vertical axis and the seat occupant decides to rotate the seat away from the forward-facing position to seek a more relaxed seating position (e.g., stretching his legs), the stability of the seat occupant within the seat is compromised. This is due in part to the limbs of the seat occupant being supported by features along the vehicle floor and a steering wheel in the driving configuration and the subsequent loss of those features in the rotated position of the seat. In the driving configuration, for example, the upper limbs of the seat occupant may be grasping the steering wheel (or an armrest along the door or center console for the passenger), and the lower limbs may be pressed against accelerator or brake pedals or an inclined surface of a conventional vehicle floor that faces the front of the seat only in the forward-facing position. Seat occupants unknowingly press their limbs against these various features to maintain stability against inertia-induced body movement during vehicle acceleration, deceleration, turning, climbing, descending, etc. The stability provided to the seat occupant within the seat by such features is so constant and common that it is unnoticeable until they are no longer there. The foot rest described herein restores that stability when the seat is moved away from its normal position to a rotated and/or extreme rearward position.

FIG. 3 illustrates another embodiment with the passenger cabin 10 reconfigured differently than in FIGS. 1 and 2. In this example, the first seat 14 is in the forward-facing position and a more forward position than in FIG. 1, and the second seat 18 is in an inwardly-rotated position, rotated about a vertical axis Z2 and with its longitudinal axis L2 intersecting the longitudinal axis Y of the vehicle at an obtuse angle. The foot rest 20 is illustrated in a different first position than the first position of FIG. 1, and the second position of the foot rest 20 is shown in broken lines. The illustrated second position is identical to the second position illustrated in FIG. 1, with the resting surface inclined to face toward the first seat and extending perpendicular to the pre-determined position of the longitudinal axis L' of the first seat 14 when it moves to its inwardly-rotated position. But in this example, the first position of the foot rest 20 is such that the resting surface is inclined to face the front side 30 of the second seat 18, lying along the longitudinal axis L2 of the second seat with the second seat in its rotated position.

This embodiment allows an occupant of a seat in the same row as the first seat 14 to use the foot rest 20 while the occupant of the first seat is not using it. Movement of the foot rest 20 between the first and second positions in this case is rotational movement in a horizontal plane about a vertical axis defined where the longitudinal axes of the first and second seats intersect when both seats are in their inwardly-rotated positions. In the example of FIG. 3, the foot rest 20 is not configured for rotation about a horizontal pivot axis as in FIG. 1, but it is possible to combine both types of rotation. For instance, the first and second positions of the foot rest may be defined by which of the first or second seats 14, 18 the resting surface 28 is facing, and the foot rest may be further configured for rotation about a horizontal pivot axis so that the seat occupant can fine-tune the angle of incline of the resting surface 28 to their liking. The foot rest 20 may be configured for coordinated movement to the second position and away from the first position when the first seat 14 moves to its inwardly-rotated position. Alternatively, the position of the foot rest may be user-selectable independent of the position of either one of the seats. The foot rest may also be configured to assume a third position between the first and second positions, for example when both seats 14, 18 are in their forward-facing positions.

The foot rest 20 may include or be coupled with the vehicle body 16 via an adjustment mechanism that allows the illustrated movement. Such an adjustment mechanism may include, for example, a pin/arcuate slot coupling between a foot rest mounting bracket and the floor 22 and/or an armature coupling the foot rest with a vertical motor shaft, to name a few examples that are not illustrated in detail here. Foot rest movement may manual or provided by known mechanisms that include an actuator such as a motor, solenoid, or fluid-powered cylinder as noted in the previous example, and actuation may be initiated in the same ways.

FIG. 4 illustrates another embodiment in which the first seat 14 is configured for rotational movement about the vertical axis Z between the forward-facing position and a plurality of rotated positions, and the foot rest 20 is configured for movement among a plurality of different positions. Each of the different positions of the foot rest corresponds to a different one of the rotated positions of the seat 14 such that the resting surface 28 of the foot rest is inclined to face toward the front side 30 of the seat at the same orientation with respect to the longitudinal axis L of the seat in each one of the plurality of different positions. In other words, the foot rest 20 rotates with the seat 14.

In FIG. 4, the seat 14 is illustrated in one of the plurality of rotated positions, inwardly-rotated with respect to the forward-facing position by angle $\alpha$, and the foot rest 20 is illustrated in the corresponding one of its plurality of different positions, with several other of its plurality of different positions depicted in broken lines. In the particular embodiment of FIG. 4, the foot rest 20 is coupled with the floor 22 of the vehicle body 16 and is configured to move in a coordinated manner with the seat 14. The foot rest 20 may be coupled with the floor 22 via a movement mechanism to facilitate its rotation about the same axis as the seat. A variety of suitable mechanisms are possible, such as a mechanism including an arcuate track affixed to the floor and a guide pin or wheel extending from the foot rest and configured to bear against and follow the track. Other of the above-described foot rest movements, such as pivotal movement about a horizontal pivot axis and/or translational movement toward and away from the seat, may be combined with the illustrate movement. Coordination of the movement of the foot rest 20 with the seat 14 may be via electronic or other suitable linkage. For instance, a seat sensor and/or encoder may provide real-time seat position and orientation information to a processor, and that processor may be configured to actuate corresponding movement of the foot rest 20 along its arcuate path.

Figure 5:
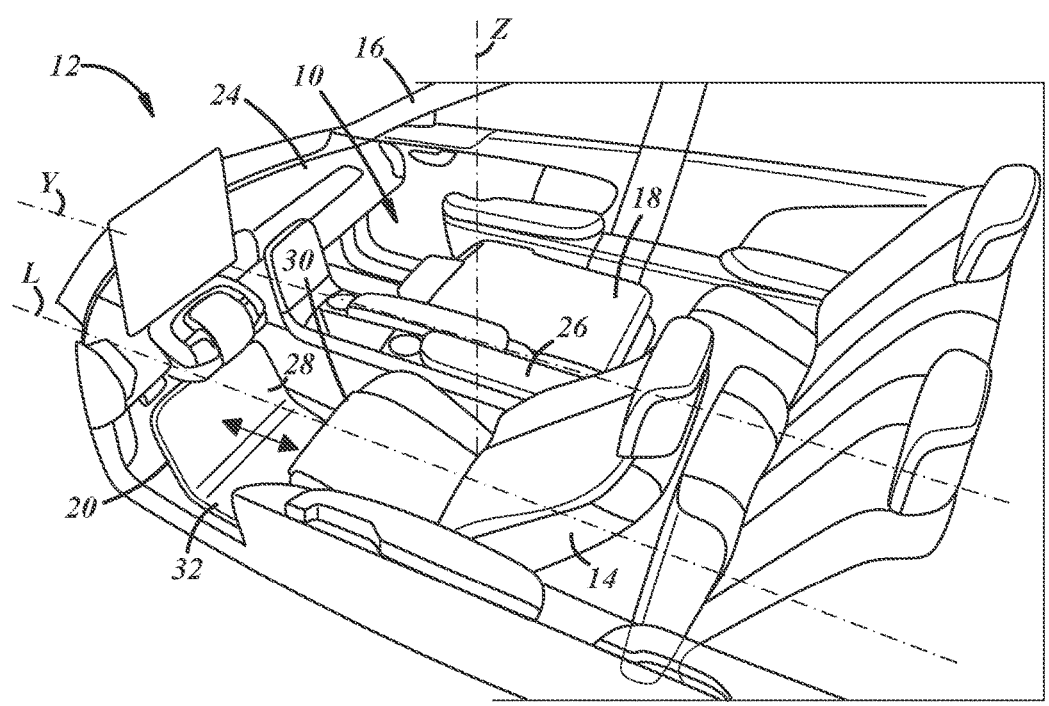
FIG. 5 is a perspective view of another example of the reconfigurable passenger cabin in which the foot rest is coupled with the first seat.

In another example, coordination of the rotational movement of the foot rest 20 with the seat 14 may be via mechanical linkage. A particular example of this type of linkage between the seat 14 and foot rest is illustrated in FIG. 5. In this example, the first seat 14 is illustrated in the forward-facing position with its longitudinal axis L parallel with the longitudinal axis Y of the vehicle 12. The foot rest 20 is illustrated in its second position, which is consistent with each of the above-described second positions—i.e., with the resting surface 28 inclined, spaced from, and facing toward the front side 30 of the seat 14. The foot rest 20 is attached to the seat 14 via a connecting member 32, which in this case is integrally formed as a single piece with the foot rest 20. The foot rest is also configured for movement toward and away from the seat 14 along its longitudinal axis via movement of the connecting member 32.

In one embodiment, the illustrated second position of the foot rest 20 is an extended position of the foot rest, and the foot rest is moveable between the extended position and a stowed position. In one example, the stowed position brings the foot rest 20 toward the seat 14 such that the resting surface lies adjacent to and faces a portion of the seat bottom beneath a cushion of the seat bottom. The foot rest 20 may be in this stowed position while not being used by the occupant of the seat 14, such as when the seat occupant is driving the vehicle, then extend out away from the seat to the extended position when the passenger cabin is reconfigured, such as when the autonomous mode of the vehicle is activated. In another example, the stowed position takes the foot rest 20 further away from the seat 14 such that foot rest 20 lies against the floor of the vehicle. The foot rest 20 may be in this alternative stowed position while not being used by the occupant of the seat 14, such as when the seat occupant is driving the vehicle, then retract in toward the seat to the extended position when the passenger cabin is reconfigured, such as when the autonomous mode of the vehicle is activated.

In the illustrated autonomous configuration, the center console 26 is not moved to a stowed position that allows the seat 14 to be rotated about the vertical axis Z. Nonetheless, the example of FIG. 5 illustrates additional useful aspects of the moveable foot rest disclosed herein. As is clear from the above description, the moveable foot rest 20 is useful in reconfigurable vehicle passenger cabins even without rotation of the seat. In the configuration of FIG. 5, the steering wheel is retracted, a second row seat behind the first seat 14 has a bottom that is rotated to a vertical position, the second seat 18 is in a fold-flat configuration, the driver pedals (i.e., brake/accelerator) are in a raised position, front door panels are moved to rearward positions, a video screen is deployed above the steering wheel, and an armrest portion of the center console is moved to a rearward position. In combination, the positions of all of these elements creates an increased volume of free space that is available for the occupant of the first seat 14 to use, and having a place to rest his feet when assuming a more relaxed position in the seat 14 and in the passenger cabin 10 is an important part of the use of this increased volume, at least to provide stability to the seat occupant as the vehicle moves along a path to its destination. Also, it should be clear that the particular seat 14 and attached foot rest 20 is adaptable to achieve the same co-rotation of the seat and foot rest illustrated in FIG. 4 when installed in a passenger cabin in which the center console 26 is stowable or omitted.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A personal automotive vehicle having a reconfigurable passenger cabin, comprising:
   a vehicle body comprising a floor that partly defines an interior of the passenger cabin;
   a seat in the interior and over the floor of the passenger cabin, the seat being coupled with the vehicle body for rotational movement about a vertical axis between a forward-facing position and an inwardly-rotated position; and
   a foot rest mounted in the interior of the passenger cabin for movement between a first position and a second position,
   wherein the foot rest comprises a resting surface spaced from and inclined to face toward a front side of the seat when in the second position with the seat in the inwardly-rotated position, and
   wherein the foot rest lies along a longitudinal axis of the seat when the seat is in the inwardly-rotated position but not when the seat is in the forward-facing position.

2. A personal automotive vehicle as defined in claim 1, wherein the seat is rotated about the vertical axis by an angle of 15 to 25 degrees from the forward-facing position when in the inwardly-rotated position.

3. A personal automotive vehicle as defined in claim 1, wherein the foot rest is mounted along the floor of the vehicle body such that the resting surface is declined to match the surface of the surrounding floor when in the first position.

4. A personal automotive vehicle as defined in claim 1, wherein the foot rest is mounted along the floor at a fixed position corresponding to the inwardly-rotated position of the seat.

5. A personal automotive vehicle as defined in claim 1, wherein the seat is included in a front row of seats.

6. A personal automotive vehicle as defined in claim 1, wherein the seat is a first seat of a row of seats that includes a second seat, and the resting surface is inclined to face toward a front side of the second seat when the foot rest is in the first position.

7. A personal automotive vehicle as defined in claim 1, wherein the foot rest is coupled with the floor.

8. A personal automotive vehicle as defined in claim 1, wherein the passenger cabin has a driving configuration in which the seat is in the forward-facing position and an autonomous configuration in which the seat is in the inwardly-rotated position.

9. A personal automotive vehicle as defined in claim 1, wherein movement of the foot rest between the first and second positions is rotational movement about a pivot axis, the pivot axis being at a fixed angle with respect to a longitudinal axis of the vehicle and perpendicular to a longitudinal axis of the seat when the seat is in the inwardly-rotated position.

10. A personal automotive vehicle having a reconfigurable passenger cabin, comprising:
    a vehicle body comprising a floor that partly defines an interior of the passenger cabin;
    a seat in the interior and over the floor of the passenger cabin, the seat being coupled with the vehicle body for rotational movement about a vertical axis between a forward-facing position and an inwardly-rotated position; and
    a foot rest mounted in the interior of the passenger cabin for movement between a first position and a second position,
    wherein the foot rest comprises a resting surface spaced from and inclined to face toward a front side of the seat when in the second position with the seat in the inwardly-rotated position, and
    wherein the seat is a first seat of a row of seats that includes a second seat, and the resting surface is inclined to face toward a front side of the second seat when the foot rest is in the first position.

11. A personal automotive vehicle as defined in claim 10, wherein the seat is rotated about the vertical axis by an angle of 15 to 25 degrees from the forward-facing position when in the inwardly-rotated position.

12. A personal automotive vehicle as defined in claim 10, wherein the row of seats is a front row of seats.

13. A personal automotive vehicle as defined in claim 10, wherein the foot rest is coupled with the floor.

14. A personal automotive vehicle as defined in claim 10, wherein the passenger cabin has a driving configuration in which the seat is in the forward-facing position and an autonomous configuration in which the seat is in the inwardly-rotated position.

* * * * *